United States Patent
Dolgunov et al.

(10) Patent No.: US 8,392,714 B2
(45) Date of Patent: Mar. 5, 2013

(54) SECURE OVERLAY MANAGER PROTECTION

(75) Inventors: Boris Dolgunov, Ramat Gan (IL); Yonatan Halevi, Petah Tikva (IL); Eran Shen, Nahariya (IL); Amir Samuelov, Haifa (IL); Niv Cohen, Kibbutz Shamir (IL); Michael Holtzman, Cupertino, CA (US); Rotem Sela, Maalot (IL)

(73) Assignee: SanDisk IL Ltd., Kfar Saba (IL)

( * ) Notice: Subject to any disclaimer, the term of this patent is extended or adjusted under 35 U.S.C. 154(b) by 740 days.

(21) Appl. No.: 12/255,229

(22) Filed: Oct. 21, 2008

(65) Prior Publication Data

US 2009/0113207 A1 Apr. 30, 2009

(30) Foreign Application Priority Data

Oct. 30, 2007 (IL) .......................... 187039

(51) Int. Cl.
*H04L 9/32* (2006.01)

(52) U.S. Cl. .......................... 713/176; 713/187; 717/168

(58) Field of Classification Search .................. 713/176, 713/187; 717/168
See application file for complete search history.

(56) References Cited

U.S. PATENT DOCUMENTS

| | | | | |
|---|---|---|---|---|
| 7,093,299 | B1* | 8/2006 | Kamijo et al. | 726/29 |
| 7,103,779 | B2* | 9/2006 | Kiehtreiber et al. | 713/187 |
| 7,644,287 | B2* | 1/2010 | Oerting et al. | 713/187 |
| 7,831,838 | B2* | 11/2010 | Marr et al. | 713/187 |
| 2003/0200448 | A1* | 10/2003 | Foster et al. | 713/189 |
| 2005/0005101 | A1* | 1/2005 | Yenduri | 713/164 |
| 2005/0076226 | A1 | 4/2005 | Boivie et al. | |
| 2005/0198051 | A1* | 9/2005 | Marr et al. | 707/100 |
| 2006/0026569 | A1* | 2/2006 | Oerting et al. | 717/126 |
| 2006/0107047 | A1 | 5/2006 | Bar-El | |
| 2006/0161767 | A1 | 7/2006 | Wang et al. | |
| 2006/0288223 | A1* | 12/2006 | Kiehtreiber et al. | 713/176 |
| 2007/0143530 | A1 | 6/2007 | Rudelic et al. | |

FOREIGN PATENT DOCUMENTS

EP 1645931 4/2006

OTHER PUBLICATIONS

Boris Dolgunov, et al., "Enabling optimal security for removable storage devices", Security in storage workshop, 2007, SISW '07, Fourth International IEEE, Piscataway NJ, US, Sep. 1, 2007, pp. 15-21.
International Search Report and Written Opinion for PCT/IL2008/001388, dated Feb. 17, 2009, 15 pages.
International Preliminary Report on Patentability for PCT/IL2008/001388, dated May 14, 2010, 8 pages.
Joel Rosenberg, "Embedded Flash on a CMOS Logic Process Enables Secure Hardware Encryption for Deep Submicron Designs", Published by Virage Logic, Corp. (Fremont, California), Nov. 2005.

* cited by examiner

*Primary Examiner* — April Shan

(74) *Attorney, Agent, or Firm* — Brinks Hofer Gilson & Lione

(57) ABSTRACT

A method for protection of data includes maintaining a control parameter indicative of a current version of the data. The data is partitioned into multiple segments. Respective signatures of the segments are computed, responsively to the control parameter, the segments and respective signatures forming respective signed input segments, which are stored in a memory. After the signed input segments are stored, a signed output segment is fetched from the memory. The signature of the signed output segment is verified responsively to the control parameter, and the data in the signed output segment is processed responsively to verifying the signature.

14 Claims, 2 Drawing Sheets

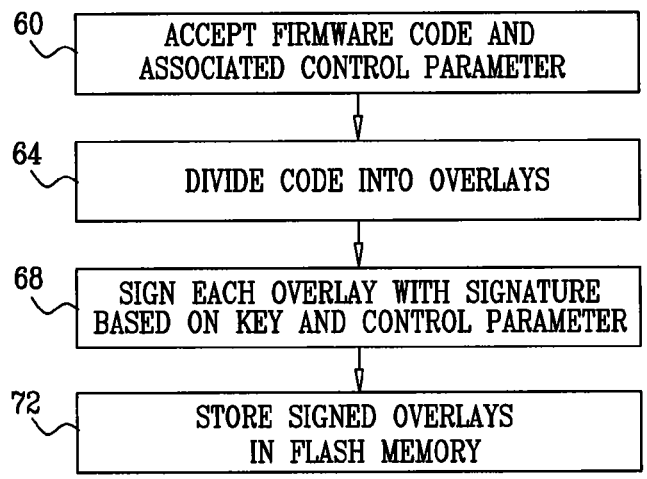
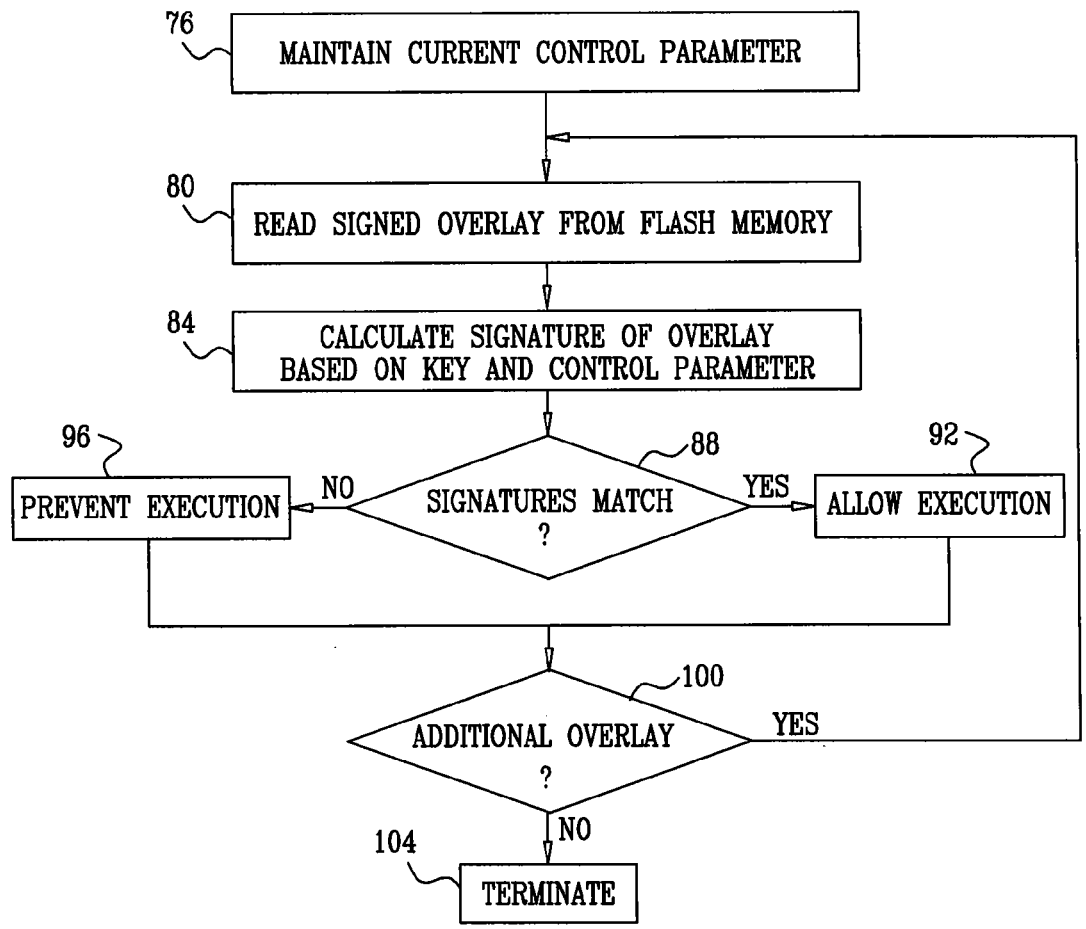

SECURE OVERLAY MANAGER PROTECTION

FIELD OF THE INVENTION

The present invention relates generally to data security, and particularly to methods and systems for securing data stored in memory devices.

BACKGROUND OF THE INVENTION

Data that is stored in memory devices is sometimes protected against unauthorized access or manipulation, such as using cryptographic means. In some known methods, a global authentication code is used for authenticating the integrity of a plurality of groups of records, based on a plurality of group authentication codes corresponding to the plurality of groups.

SUMMARY OF THE INVENTION

Embodiments of the present invention provide a method for protection of data, including:

maintaining a control parameter indicative of a current version of the data;

partitioning the data into multiple segments;

computing respective signatures of the segments responsively to the control parameter, the segments and respective signatures forming respective signed input segments;

storing the signed input segments in a memory;

after storing the signed input segments, fetching a signed output segment from the memory;

verifying the signature of the signed output segment responsively to the control parameter; and processing the data in the signed output segment responsively to verifying the signature.

In some embodiments, the data includes executable program code, and processing the data in the signed output segment includes executing the program code. Computing the signatures may include computing the signatures responsively to respective storage locations of the signed input segments in the memory. Additionally or alternatively, computing the signatures may include evaluating a cryptographic function that operates on the control parameter and on a cryptographic key.

In another embodiment, the method further includes encrypting the data responsively to the control parameter. In yet another embodiment, storing the signed input segments includes writing each segment and associated signature to a single page of the memory, and fetching the signed output segment includes reading the signed output segment using a single read operation.

In a disclosed embodiment, maintaining the control parameter includes maintaining multiple values of the control parameter corresponding to multiple versions of the data, and verifying the signature includes verifying the signature responsively to any of the multiple values. Typically, verifying the signature of the signed output segment includes verifying the signature independently of any other signed output segment.

There is additionally provided, in accordance with an embodiment of the present invention, apparatus for storage of data, including:

a memory device; and a controller, which is configured to hold a control parameter indicative of a current version of the data, to partition the data into multiple segments, to compute respective signatures of the segments responsively to the control parameter, the segments and respective signatures forming respective signed input segments, to store the signed input segments in the memory device, to fetch, after storing the signed input segments, a signed output segment from the memory device, and to verify the signature of the signed output segment responsively to the control parameter.

Typically, the apparatus further includes an interface, which is configured to communicate between the controller and the memory device. In some embodiments, the controller includes a Non-Volatile Memory (NVM), which is coupled to hold the control parameter. In an embodiment, the memory includes a Flash memory device.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for secure data storage in a memory device, in accordance with an embodiment of the present invention; and FIG. 3 is a flow chart that schematically illustrates a method for secure data retrieval from a memory device, in accordance with an embodiment of the present invention.

DETAILED DESCRIPTION OF EMBODIMENTS

Overview

Figure 1:
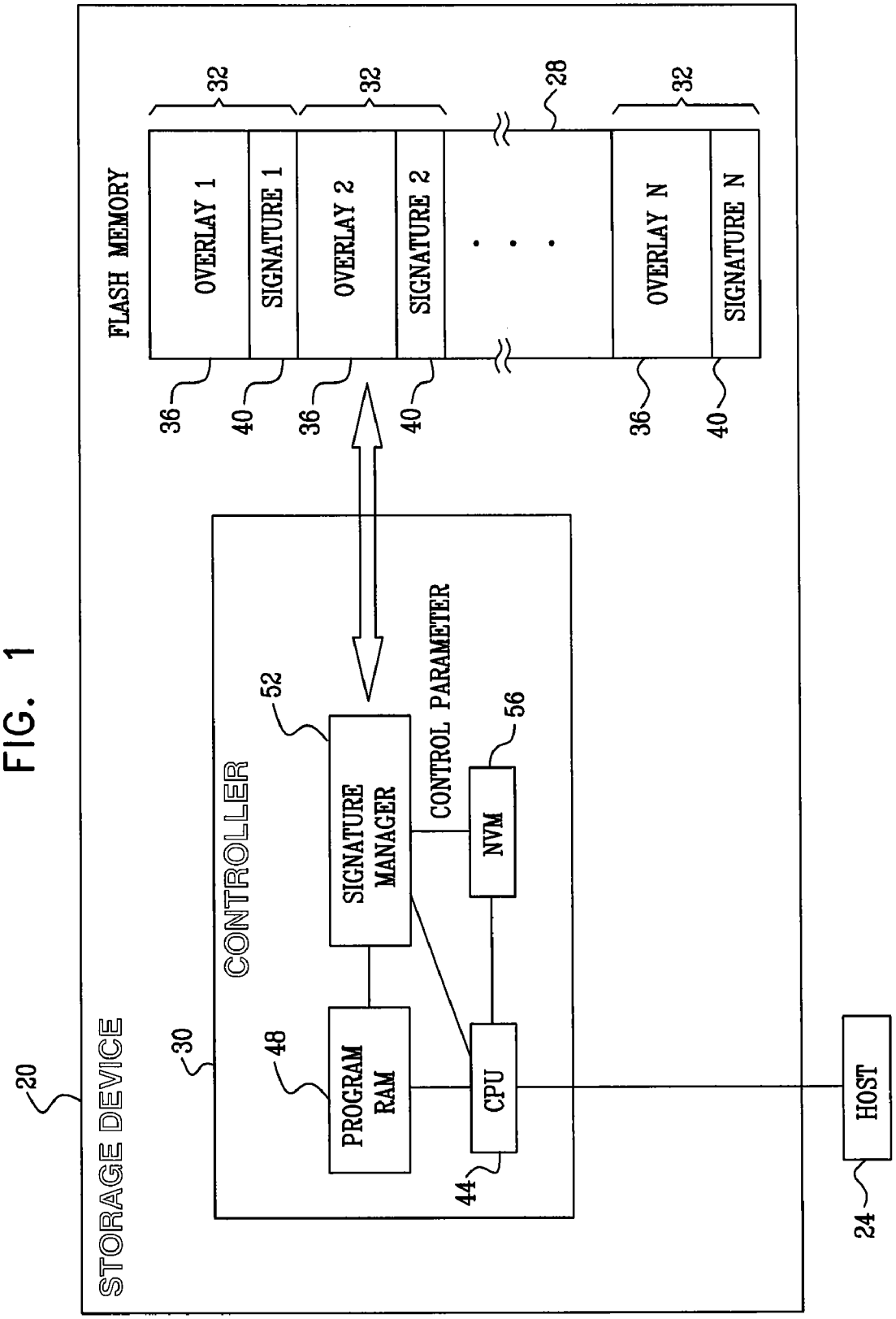
FIG. 1 is a block diagram that schematically illustrates a storage device, in accordance with an embodiment of the present invention.

Embodiments of the present invention provide improved methods and systems for securing data that is stored in memory devices. In some embodiments that are described hereinbelow, a storage device comprises a memory device, such as a Flash memory, and a controller, which stores and retrieves the data. The controller runs program code, which is stored in the memory device and may be updated from time to time. The code is stored in the memory in segments, referred to as overlays. The controller retrieves overlays from the memory and executes the code stored therein, either during initialization or at run-time.

In many practical implementations, such as when the memory and the controller comprise separate devices, an unauthorized user (referred to herein as an attacker) may potentially gain access to the memory device and tamper with the stored program code. Thus, the controller cannot generally assume that the program code stored in the memory device is trustworthy. In order to protect the stored code against unauthorized intervention, the controller signs each overlay with a cryptographic signature and stores the signature along with the overlay. The overlay and its respective signature are referred to as a signed overlay. When retrieving a signed overlay from the memory, the controller verifies the authenticity of the signature, and allows execution of the code contained in the overlay only when the signature is valid.

In some embodiments of the present invention, the cryptographic signatures used for signing the overlay are computed in a way that protects the code from various actions that may be taken by an attacker. For example, the attacker may copy signed overlays belonging to a previous code version from the memory of a certain storage device, and write these overlays to the memory of another storage device. In order to protect the storage device from such actions, the controller computes the overlay signatures based on a control parameter, which is indicative of the current version of the program code. The control parameter is stored internally to the controller, such as in an internal Non-Volatile Memory (NVM).

When updating code versions, the controller signs the updated overlays with signatures, which are computed based on the current control parameter value. When verifying the signature of a signed overlay retrieved from memory, the controller computes an expected signature value based on the internally-stored current control parameter value, and compares the retrieved and expected signature values. Thus, a signed overlay that belongs to a different code version (including a version illegitimately copied from another device) will not be allowed to execute.

In some embodiments, the overlay signature also depends on the storage location of the signed overlay in the memory, so as to protect the storage device from attacks that modify the storage locations of legitimate signed overlays.

The methods and systems described herein provide a secure, smooth and fast boot process. Unlike some known protection schemes, in which it is necessary to retrieve multiple signatures or signature groups in order to determine the version number of a certain overlay, the methods and systems described herein sign each individual overlay based on the current code version. Thus, it is possible to retrieve and verify each signed overlay independently of any other overlay. This feature significantly increases the speed of the boot process and/or decreases the size of the controller Random Access Memory (RAM) used for boot or loading of program code.

Moreover, in many storage device configurations, the controller loads to RAM and executes only a small portion of the overall program code at any given time. In these configurations, the controller reads signed overlays from the memory device and verifies them at run-time. The methods and systems described herein enable the controller to retrieve and verify only overlays that need to execute at a given time, without the need to read additional overlays for the sake of version number verification. This feature provides a significant performance improvement in comparison with known methods. All of these performance improvements are provided without compromising data security.

System Description

FIG. 1 is a block diagram that schematically illustrates a storage device 20, in accordance with an embodiment of the present invention. Device 20 typically comprises a removable storage device such as a Disk-on-Key, memory card or smartcard, but may generally comprise any other suitable device type. Device 20 communicates with a host 24, which may comprise, for example, a computing device, a digital camera, a mobile phone, or any other suitable host system that stores data. Host 24 sends data for storage to device 20, and retrieves data that is stored in the storage device. Storage device 20 comprises a memory 28, in the present example comprising a Flash memory device. In alternative embodiments, however, memory 28 may comprise any other suitable type of volatile or non-volatile memory.

Device 20 comprises a controller 30, which manages and controls the operation of the storage device. In particular, controller 30 receives data for storage from host 24, processes the data and stores it in memory 28. In the opposite direction, the controller reads data from memory 28, processes the data and forwards it to host 24. Controller 30 comprises a Central Processing Unit (CPU) 44, which runs program code that is cached in a Random Access Memory (RAM) 48. (The program code is sometimes referred to as firmware or software, and all of these terms are used interchangeably herein.)

The program code run by CPU 44 is stored in memory 28. When the controller initializes, the CPU boots from memory 28, i.e., retrieves the desired code from memory 28 and executes it. Typically, the controller comprises a relatively small boot kernel stored in Read Only Memory (ROM), which carries out the retrieval process, whereas the vast majority of the program code is stored in memory 28. In some embodiments, the controller reads program code from memory 28 at run-time, as well. In these embodiments, the overall size of the program code used by CPU 44 (and the size of memory 28) is much larger than the size of RAM 48. At any given moment, RAM 48 caches only a portion of the code that is currently being executed. The CPU reads different parts of the program code during operation, as needed, from memory 28 to RAM 48.

In a typical implementation of storage device 20, memory device 28 and controller 30 comprise separate devices, such as separate Integrated Circuits (ICs) assembled on a Printed Circuit Board (PCB) or separate semiconductor dyes in a Multi-Chip Module (MCM) or System on Chip (SoC). Since memory 28 is separate from controller 30, it may be possible for an unauthorized user (attacker) to access memory 28 and tamper with the stored program code. Such unauthorized intervention may, for example, damage the application run by the controller, expose sensitive information stored in the memory, enable the attacker to perform unauthorized operations using the storage device, and/or cause the storage device to malfunction. Generally, controller 30 cannot assume that the program code stored in memory 28 is trustworthy.

On the other hand, it is highly desirable for controller 30 to have a smooth, fast and secure process of reading program code from memory 28, during both initialization and run-time.

In view of the security vulnerabilities described above, embodiments of the present invention provide improved methods and systems for secure storage and retrieval of data (e.g., program code) from memory 28. In some embodiments, controller 30 divides the program code for storage into segments, referred to as overlays 36. The controller signs each overlay 36 with a cryptographic signature 40, and stores each overlay and its respective signature in memory 28 as a signed overlay 32. In a typical application, the size of the entire program code may be several hundred Kilobytes, each overlay may be several Kilobytes in size, and the size of each signature may be in the range of 128 to 256 bytes. Alternatively, however, any other suitable sizes can also be used.

In the embodiments described herein each signature is stored adjacently to its respective overlay. In alternative embodiments, however, signatures can also be stored separately from the corresponding overlays, as desired. Storing each signature together with its respective overlay is often advantageous, as it may enable reading both the signature and program code of the overlay in a single read operation.

The controller may use any suitable signature and signing method for computing and verifying signatures 40. For example, the controller may apply a hashing function to the program code of a particular overlay, and then sign the hash result with a secret cryptographic key. Any suitable hashing function, such as a Hashed Message Authentication Code (HMAC) or Cipher-based Message Authentication Code (CMAC), may be used. Alternatively, the controller can use any suitable checksum as a signature. The controller may use a public/private key signature scheme, or any other cryptographic method, for signing the hash result.

Even when using cryptographic signatures, it is theoretically possible for an attacker to copy signed overlays from memory 28 of a certain storage device, and write these signed overlays to memory 28 of another storage device. In order to avoid such a scenario, controller 30 continuously maintains a value, referred to herein as a control parameter, which is indicative of the current version of the program code that is in use. The controller computes the signatures of the different overlays based on the control parameter value. When reading a signed overlay from memory 28, the controller calculates an expected signature value using the current value of the control parameter, i.e., based on the current or expected code version. Therefore, if an attacker overwrites a legitimate signed overlay in memory 28 with a copied overlay belonging to a previous version, the signature of this copied overlay will differ from the expected signature, and the unauthorized attempt will be blocked.

Controller 30 comprises a signature manager 52, which carries out the signature generation and verification functions described herein. The controller further comprises a Non-Volatile Memory (NVM) 56, for storing the current value of the control parameter. NVM 56 may comprise, for example an Electrically Erasable Programmable Read-Only Memory ($E^2$PROM) device or any other suitable NVM device type. For example, Rosenberg describes a method for embedding non-volatile memory in a standard Complementary Metal Oxide Semiconductor (CMOS) process in a white paper published by Virage Logic, Corp. (Fremont, Calif.), entitled "Embedded Flash on a CMOS Logic Process Enables Secure Hardware Encryption for Deep Submicron Designs," November, 2005, which is incorporated herein by reference.

In the context of the present patent application and in the claims, the term "control parameter" is used to describe any value that is correlative to the version of program code that is currently in use, or expected to be used, by the storage device. In some embodiments, the control parameter comprises the version number itself or a number that uniquely identifies the current version. Alternatively, the control parameter may be only statistically correlated with the current version. In other words, the value of the control parameter may indicate a certain program version with a certain probability. For example, the control parameter may comprise a random or pseudo-random number that is statistically indicative of the current version. The control parameter may comprise a numerical value or any other suitable representation, e.g., a character or string. A value that is used for authentication and is typically used only once is often referred to in security applications as a "cryptographic nonce." Any form of cryptographic nonce known in the art can also be used as the control parameter.

In another scenario, an attacker may perform block substitution within memory 28, e.g., copy one or more of the legitimate signed overlays to different storage locations in the memory, or replace legitimate signed overlays with one another. Such intervention scenario would not be detected by the signature mechanism described above, since the modified overlays are legitimate, but stored at illegitimate locations. In order to avoid intervention scenarios that change the storage locations of legitimate overlays, the controller may use signatures that take into account the storage location of the signed overlay in the memory, in addition to the control parameter. The signature computation may be based on any value that is indicative of the storage location of the overlay.

In some embodiments, the controller encrypts the program code in addition to signing. The controller may use any suitable encryption scheme, such as known public/private key schemes.

The different components of controller 30 may be implemented in hardware or firmware, such as in an Application-Specific Integrated Circuit (ASIC) or Field-Programmable Gate Array (FPGA). Alternatively, some of the functions of controller 30 may be carried out in software, or using a combination of hardware and software elements.

Secure Storage and Retrieval Methods

FIG. 2 is a flow chart that schematically illustrates a method, carried out by controller 30, for secure data storage in memory device 28, in accordance with an embodiment of the present invention. The method begins with controller 30 accepting a new firmware (program code) version for storage in memory 28, at a version input step 60. For example, host 24 may provide storage device 20 with an updated firmware version that should be used from now on. (The storage device typically applies various means to verify that the new program code provided by the host is legitimate. These means, however, are considered to be outside the scope of the present patent application.)

The newly-accepted version has an associated version number or other identifier. The controller calculates the current value of the control parameter, which is, as explained above, indicative of the current version of the code. The controller stores the calculated control parameter value in NVM 56.

Controller 30 divides the program code into multiple overlays, at a partitioning step 64. The controller signs each overlay, at a signing step 68. The controller computes the signature of each overlay based on the control parameter stored in NVM 56. Typically, the controller hashes the data of each overlay, and signs the hashed data using a private cryptographic key. In general, the controller may compute the signature by evaluating any suitable cryptographic function that operates on the key and the control parameter. Controller 30 stores the signed overlays in memory 28, at a storage step 72. Each signed overlay 32 stored in memory 28 comprises the respective signature 40.

FIG. 3 is a flow chart that schematically illustrates a method, carried out by controller 30, for secure data retrieval from memory device 28, in accordance with an embodiment of the present invention. Controller 30 maintains the current value of the control parameter, at a control parameter maintaining step 76. The control parameter is indicative of the current, or expected, version of program code.

Either at initialization (e.g., initialization or reset) or during run-time, controller 30 retrieves a signed overlay from memory 28, at a reading step 80. The controller computes a signature value that is expected to be conveyed by the retrieved signed overlay, and compares the expected signature with the signature that is actually contained in the retrieved signed overlay. For example, the controller may hash the retrieved program code of the overlay, and compare the result with the hash result stored with the overlay. Since the signature depends on the control parameter stored in NVM 56, the expected signature will match the actual signature retrieved from the overlay only if both are based on the same control parameter, i.e., belong to the same code version.

Controller 30 checks whether the signature contained in the retrieved overlay matches the expected signature, at a match checking step 88. If the signatures match, the controller regards the overlay as legitimate and allows it to execute, at an allowed execution step 92. The controller then typically loads the overlay to RAM 48 and executes the code. Otherwise, i.e., if the signatures do not match, the controller regards the overlay as untrustworthy and prevents its execution, at an execution prevention step 96.

The controller checks whether an additional overlay is to be read, at a next overlay checking step 100. If no more overlays are to be read, the method terminates, at a termination step 104. Otherwise, the method loops back to reading step 80 above, in order to read another overlay.

In some embodiments, the controller may maintain multiple values of the control parameter, which are indicative of multiple program code versions that are considered legitimate. This feature enables, for example, supporting code versions that update only part of the program code, and not necessarily the entire code. When reading a signed overlay from memory 28, the controller may compare the signature of the read overlay with multiple expected signatures, corresponding to the multiple values of the control parameter. If the signature of the overlay matches any of the expected signatures, i.e., the version number of the overlay comprises one of the versions that are considered legitimate, the controller allows execution of the code in the overlay. If the overlay signature does not match any of the expected signatures, execution is prevented.

Data is typically written to memory 28 in pages. A page is typically defined as the amount of data that can be written or retrieved in a single read/write operation. In some embodiments, controller 30 writes an entire signed overlay, including its data and signature, in a single page of the memory device. Thus, an entire signed overlay can be read and verified by the controller in a single read operation. This feature increases the reading throughput of the storage device, in comparison with schemes in which the data and signature of a certain overlay are stored in different memory pages.

Note that in the methods and systems described herein, a certain signed overlay can be verified independently of any other overlay. When updating program code, however, multiple signed overlays should be updated to reflect the new control parameter value. The embodiments described herein are therefore particularly suitable for securing the storage of program code, which is usually verified frequently but updated infrequently (often only several times during the lifetime of the storage device). Nevertheless, the methods and systems described herein can also be used to protect other types of data, such as user data and data used by the software, even if such data is updated at frequent intervals. For example, simultaneous support of multiple control parameter values may reduce the number of signed overlays that need updating.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is

1. A method for protecting data, the method comprising:
maintaining, in a controller, a control parameter indicative of a current version of data, the controller including a kernel in Read-Only Memory (ROM);
partitioning, with the controller, the data into multiple segments;
computing, with the controller, signatures for the segments of data based on the control parameter, the segments of data and associated signatures forming signed segments of data;
storing, with the controller, the signed segments of data in a memory device that is separate from the controller;
retrieving from the memory device, with the kernel in the controller, after storing the signed segments of data, a signed segment of data of the signed segments of data;
verifying, with the controller, the signature of the retrieved signed segment of data based on the control parameter, wherein the signature of the retrieved signal segment of data is verified independently of any other signed segment of data; and
processing data in the retrieved signed segment of data in response to verifying the signature of the retrieved signed segment of data.

2. The method of claim 1, wherein the data comprises executable program code, and wherein processing the data in the retrieved signed segment of data comprises executing the program code.

3. The method of claim 1, wherein computing the signatures for the segments of data comprises:
computing the signatures for the segments of data based on storage locations of the signed segments of data in the memory.

4. The method of claim 1, wherein computing the signatures for the segments of data comprises:
evaluating a cryptographic function that operates on the control parameter and on a cryptographic key.

5. The method of claim 1, further comprising:
encrypting the data based on the control parameter.

6. The method of claim 1, wherein storing the signed segments of data comprises writing each segment of data and its associated signature to a single page of the memory, and wherein retrieving the signed segment of data comprises reading the signed segment of data using a single read operation.

7. The method of claim 1, wherein maintaining the control parameter comprises maintaining multiple values of the control parameter corresponding to multiple versions of the data, and wherein verifying the signature of the retrieved signed segment of data comprises verifying the signature based on any of the multiple values.

8. A storage device comprising:
a non-volatile memory; and
a controller comprising a kernel in Read-Only Memory (ROM), the controller in communication with the non-volatile memory and configured to:
maintain a control parameter indicative of a current version of data;
partition the data into multiple segments;
compute signatures for the segments of data based on the control parameter, the segments of data and associated signatures forming signed segments of data;
store the signed segments of data in the non-volatile memory;
retrieve from the non-volatile memory, with the kernel, after storing the signed segments of data, a signed segment of data of the signed segments of data;
verify the signature of the retrieved signed segment of data based on the control parameter, wherein the signature of the retrieved signed segment of data is verified independently of any other signed segment of data; and
process data in the retrieved signed segment of data in response to verifying the signature of the retrieved signed segment of data.

9. The storage device of claim 8, wherein the data comprises executable program code, and wherein to process the data in the retrieved signed segment of data, the controller is configured to execute the program code.

10. The storage device of claim 8, wherein to compute the signatures for the segments of data, the controller is further configured to:
  compute the signatures for the segments of data based on storage locations of the signed segments of data in the memory.

11. The storage device of claim 8 wherein to compute the signatures for the segments of data, the controller is further configured to:
  evaluate a cryptographic function that operates on the control parameter and on a cryptographic key.

12. The storage device of claim 8, wherein the controller is further configured to:
  encrypt the data based on the control parameter.

13. The storage device of claim 8, wherein to store the signed segments of data, the controller is further configured to write each segment of data and its associated signature to a single page of the memory, and wherein to retrieve the signed segment of data, the controller is further configured to read the signed segment of data using a single read operation.

14. The storage device of claim 8, wherein to maintain the control parameter, the controller is further configured to maintain multiple values of the control parameter corresponding to multiple versions of the data, and wherein to verify the signature of the retrieved signed segment of data, the controller is further configured to verify the signature based on any of the multiple values.

* * * * *